(12) United States Patent
Sumida (10) Patent No.: US 8,510,586 B2
(45) Date of Patent: Aug. 13, 2013

(54) MOBILE TERMINAL AND POWER CONTROL METHOD

(75) Inventor: Haruhiko Sumida, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 0 days.

(21) Appl. No.: 13/636,885

(22) PCT Filed: Jan. 19, 2011

(86) PCT No.: PCT/JP2011/050863
§ 371 (c)(1),
(2), (4) Date: Sep. 24, 2012

(87) PCT Pub. No.: WO2011/122073
PCT Pub. Date: Oct. 6, 2011

(65) Prior Publication Data
US 2013/0019114 A1    Jan. 17, 2013

(30) Foreign Application Priority Data

Mar. 30, 2010    (JP) .................................. 2010-077800

(51) Int. Cl.
G06F 1/00 (2006.01)
G06F 1/26 (2006.01)
G06F 1/32 (2006.01)
G06F 11/30 (2006.01)
G06F 12/14 (2006.01)

(52) U.S. Cl.
USPC ............. 713/324; 713/300; 713/320; 726/26; 726/34

(58) Field of Classification Search
USPC ........... 713/192, 194, 300, 320, 324; 726/26, 726/34
See application file for complete search history.

(56) References Cited

U.S. PATENT DOCUMENTS

| 5,450,003 A * | 9/1995 | Cheon ........................... 323/272 |
| 2004/0015732 A1 * | 1/2004 | El-Kik et al. ................. 713/300 |
| 2010/0283604 A1 | 11/2010 | Sakai |

FOREIGN PATENT DOCUMENTS

| JP | 05-143477 A | 6/1993 |
| JP | 2002-164967 A | 6/2002 |
| JP | 2007-114824 A | 5/2007 |
| JP | 2008-123322 A | 5/2008 |
| JP | 2008-155863 A | 7/2008 |
| JP | 2009-129328 A | 6/2009 |

* cited by examiner

Primary Examiner — Mark Connolly
(74) Attorney, Agent, or Firm — Sughrue Mion, PLLC (57) ABSTRACT

A mobile terminal includes: a tamper-detection circuit (17), an information processor (13) that is capable of executing a suspend function, a first battery (23) supplying power to the information processor (13) and the tamper-detection circuit (17), and a switch (27) that is provided on a power-source supply line (431) that connects the first battery (23) and the information processor (13) and the switch that is capable of switching between a state in which information processor (13) is connected to first battery (23) and a state in which information processor (13) is not connected to first battery (23).

2 Claims, 10 Drawing Sheets

MOBILE TERMINAL AND POWER CONTROL METHOD

CROSS REFERENCE TO RELATED APPLICATIONS

This application is a National Stage of International Application No. PCT/JP2011/050863 filed Jan. 19, 2011, claiming priority based on Japanese Patent Application No. 2010-077800 filed Mar. 30, 2010, the contents of all of which are incorporated herein by reference in their entirety.

TECHNICAL FIELD

The present invention relates to a mobile terminal and a power control method.

BACKGROUND ART

Mobile terminals such as mobile POS (Points of Sales) and PDA (Personal Digital Assistants) should be turned off whenever not in use to limit battery consumption as much as possible but are preferably quickly ready for use when necessary. As a result, some mobile terminals have a suspend/resume function (hereinbelow referred to as simply a "suspend function").

According to the suspend function, when the power-supply switch is turned OFF, the state of the terminal immediately preceding turning OFF the power-supply switch is saved, and when the power-supply switch is subsequently turned ON, the state of the terminal immediately preceding turning OFF the power-supply switch is restored. According to this function, the operator of the mobile terminal, when turning ON the power-supply switch, is able to resume work from the state that immediately preceded turning OFF the power-supply switch. This effect is obtained because the supply of power is continued to parts of the device even while the power-supply switch is in the OFF state, but while the suspend function is operating, power consumption is low compared to the state in which the power-supply switch is in the ON state and consumption of the battery is therefore limited. The standby state in which the state of the terminal immediately preceding turning OFF the power-supply switch is saved is hereinbelow referred to as the suspend state. The suspend state is also assumed to include a function by which, without the power-supply switch being turned OFF, a terminal transitions to the power-saving suspend state with the power-supply switch in the ON state after the passage of a fixed interval with no input such as key-in. In this case, the state of the terminal immediately preceding transitioning to the power-saving suspend state is saved, and when the power-saving suspend state is subsequently canceled by, for example, key-input, the state of the terminal that immediately preceded the transition to the power-saving suspend state is revived.

On the other hand, a mobile POS that is capable of data processing for credit card payments handles personal information that is to be concealed such as credit card numbers and therefore requires measures for preventing the falsification of information that is recorded in memory. A tamper-detection circuit, which is a circuit for protecting information that is recorded in memory, is therefore provided in a mobile POS of this type. Power is supplied to the tamper-detection circuit and operation of the tamper-detection circuit is maintained even when the power-supply switch of the main unit of the mobile POS is in the OFF state.

The configuration of a mobile terminal of the related art that is provided with the above-described suspend function and tamper-detection circuit is next described.

Figure 1:
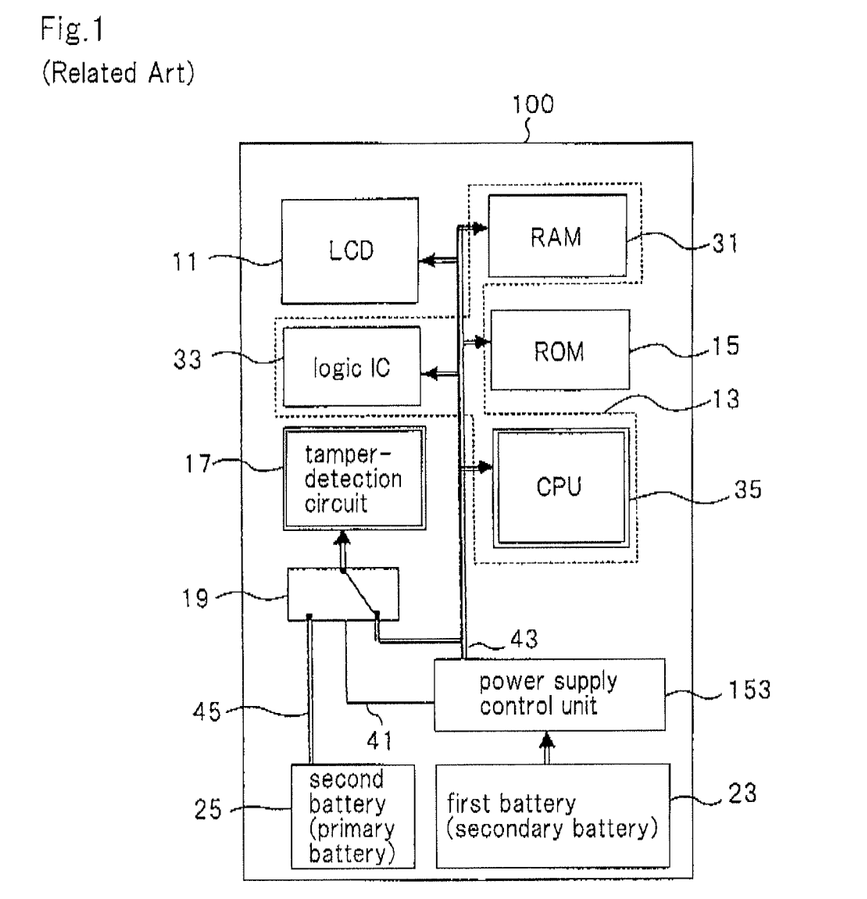
FIG. 1 is a block diagram showing an example of the configuration of the normal state of use in which the power-supply switch is in the ON state in the mobile terminal of the related art.
Figure 2:
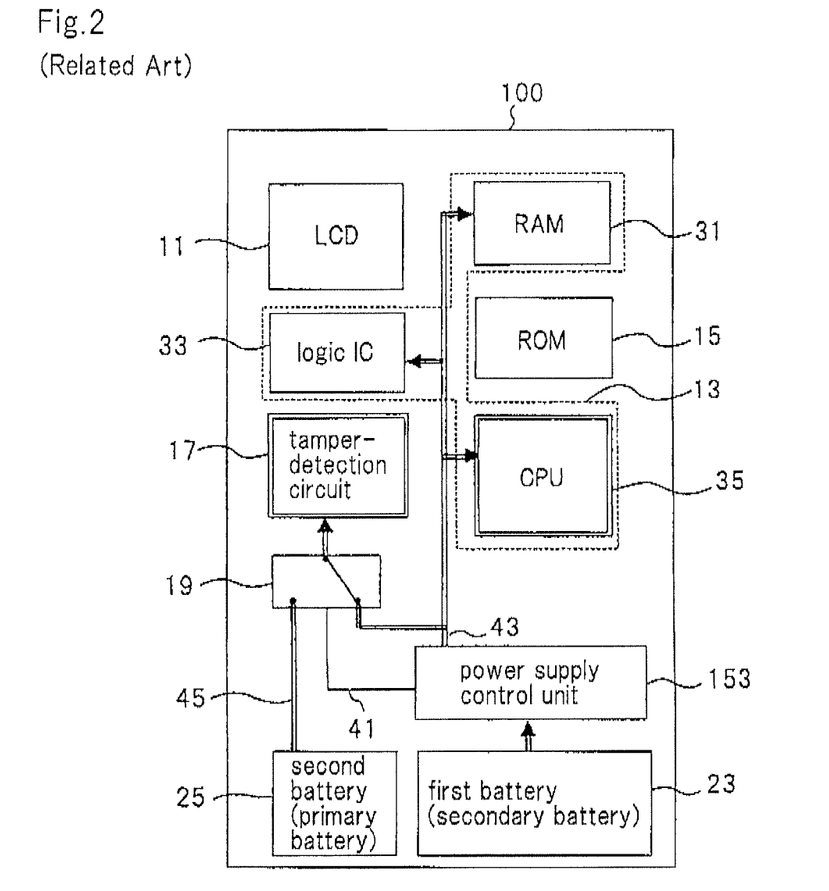
FIG. 2 is a block diagram showing an example of the configuration of the suspend state in the mobile terminal of the related art.

FIG. 1 and FIG. 2 are block diagrams showing an example of the configuration of a mobile terminal of the related art. FIG. 1 is a figure for explaining the normal state of use in which the power-supply switch is ON, and FIG. 2 is for explaining the suspend state.

As shown in FIG. 1, mobile terminal 100 includes: LCD (Liquid Crystal Display) 11 that is the display unit; information processing unit 13 that executes predetermined data processing; ROM (Read Only Memory) 15; tamper-detection circuit 17, switch 19 that switches the power-source supply line to tamper detection circuit 17; power-supply control unit 153 that supplies power to each part; first battery 23, and second battery 25 that is a back-up battery. Information processing unit 13 includes RAM (Random Access Memory) 31, logic IC (Integrated Circuit) 33, and CPU (Central Processing Unit) 35.

ROM 15 stores in advance programs for execution by CPU 35 and the information that is necessary for data processing. RAM 31 is memory for temporarily saving the results of the data processing of CPU 35 and logic IC 33.

Logic IC 33 is a dedicated logic circuit that meets the specifications of the purpose of mobile terminal 100. CPU 35 executes processing in accordance with a program that is read from ROM 15. LCD 11 displays information relating to the data processing realized by information processing unit 13 and the results of data processing to communicate this content to the operator.

The supply of power in the normal state of use when the power-supply switch is ON is next described with reference to FIG. 1.

In the normal state of use in which the power-supply switch of mobile terminal 100 is ON, power from first battery 23 is supplied from power-supply control unit 153 by way of power-source supply line 43 to LCD 11, information processing unit 13, and ROM 15. Switches (not shown) are interposed between power-source supply line 43 and LCD 11 and between power-source supply line 43 and ROM 15 that are ON/OFF controlled by information processing unit 13, and power is supplied to LCD 11 and ROM 15 when the switches are in the ON state. Power-supply control unit 153, by transmitting control signals to switch 19 by way of signal line 41, controls switch 19 to connect tamper-detection unit 17 to either power-source supply line 43 or power-source supply line 45. Here, the battery voltage of first battery 23 is greater than the predetermined voltage, whereby, under the control of power-supply control unit 153, switch 19 connects tamper-detection circuit 17 to power-source supply line 43 that extends from first battery 23. The ON state of the power-supply switch shown in FIG. 1 corresponds to the normal state of use of mobile terminal 100.

Power supply in the suspend state is next described with reference to FIG. 2. With the change to the suspend state, the supply of power continues to information processing unit 13, but the supply of power to LCD 11 and ROM 15 is discontinued by turning OFF a switch (not shown) by information processing unit 13. The power that is supplied to information processing unit 13 is only the power that is requiring to maintain the suspend state and is less than that of the normal state of use. Accordingly, less power is used than in the normal state of use and power consumption can be suppressed.

In FIG. 1 and FIG. 2, the representation of signal lines for transmitting and receiving data or control signals between each of the components has been omitted with the exception of signal line 41 by power-supply control unit 153 a control signal to switch 19, and an aspect of the supply of power from first battery 23 or second battery 25 is shown schematically.

The operations of power-supply control unit 153 are next described for a case in which the battery capacity of first battery 23 is small, i.e., when the battery voltage of first battery 23 is equal to or less than a predetermined voltage.

When the battery voltage of first battery 23 is equal to or less than a predetermined voltage, power-supply control unit 153 halts the supply of power to information processing unit 13. Power-supply control unit 153 further transmits a control signal to switch 19 by way of signal line 41 to implement control over switch 19 such that tamper-detection circuit 17 is connected to power-source supply line 45 that extends from second battery 25. This control is implemented not only when the battery voltage of first battery 23 is equal to or less than a predetermined voltage, but also when first battery 23 is removed from mobile terminal 100. Mobile terminal 100 maintains resistance to tampering even when the battery voltage of first battery 23 is equal to or less than a predetermined voltage or first battery 23 is removed by supplying power to tamper-detection circuit 17 from second battery 25 for backup.

Japanese Unexamined Patent Application Publication No. 2008-123322 discloses an electronic apparatus in which an auxiliary power-supply unit supplies power to, for example, a tamper-detection unit or a non-volatile memory when the main power-supply unit turns OFF.

SUMMARY OF THE INVENTION

As described hereinabove, the power-supply switch is preferably turned OFF when the mobile terminal is not being used so as to suppress consumption of the first battery, but when a mobile terminal for business use such as a mobile POS is being used, it is important to make effective use of the suspend function when handling a credit card payment so that the purchaser of goods will not be made to wait.

On the other hand, in a business or store in which a mobile terminal for business use is being used, reserve equipment for mobile terminals may be prepared in advance to enable appropriate measures in the event of situations such as the breakdown of a terminal or busy times in business, but such cases may also be handled without using reserve equipment. In this case, the reserve equipment is kept for long periods without being used at all. Even while being held in reserve, power is being consumed due to the operation of the suspend function and tamper-detection circuit, and as a result, even though the equipment is not being used in business, the battery capacity of the first battery becomes low in a short time period and the power supply to the tamper-detection circuit switches from the first battery to the second battery at an earlier stage than the manager of terminals may imagine. The problem therefore arises of the high frequency at which the second battery is exchanged.

Extending the life of the second battery can be considered as a measure for reducing the frequency of exchange of the back-up second battery even when the mobile terminal is kept in reserve for long periods. The life of the second battery is calculated by Formula (1) that is next shown:

The life of the second battery (h)=the capacity of the second battery (mAh)/the consumed current of the tamper-detection circuit (mA)   Formula (1)

It can be seen from Formula (1) that a method for increasing the capacity of the second battery or a method for limiting the consumed current of the tamper-detection circuit would be effective for extending the life of the second battery.

However, the constraints on the size of the device in a mobile terminal complicate increasing the volume of the second battery to increase the battery capacity. There are also limits to design modifications to a tamper-detection circuit for limiting the power consumption required in the tamper-detection circuit. As a result, extending the life of the second battery is problematic regardless of the method, and a large-scale improvement therefore cannot be expected.

An exemplary object of the invention is to provide a mobile terminal and power control method that can maintain resistance to tampering while reducing the consumed power while the mobile terminal is kept in reserve state over long periods.

A mobile terminal according to an exemplary aspect of the invention includes a tamper-detection circuit, an information processor that is capable of executing a suspend function, a first battery supplying power to the information processor and tamper-detection circuit, and a switch provided on the power-source supply line that connects the first battery and the information processor and the switch being capable of switching between a state in which the information processer is connected to the first battery and a state in which the information processor is not connected to the first battery.

A power control method according to an exemplary aspect of the invention is a power control method realized by a mobile terminal that includes a tamper-detection circuit, an information processor that is capable of executing a suspend function, a first battery supplying power to the information processor and the tamper-detection circuit, a second battery that is a back-up battery, and a switch that is provided on the power-source supply line connecting the information processor and the first battery and the switch being capable of switching between a state in which the information processer is connected to the first battery and a state in which the information processor is not connected to the first battery; the power control method including: judging whether the battery voltage of the first battery is equal to or less than a predetermined voltage; if, as the result of judging, the battery voltage of the first battery is greater than a predetermined voltage, supplying power from the first battery to the information processor and the tamper-detection circuit when the information processor and the first battery are connected by way of the switch, or supplying power from the first battery to the tamper-detection circuit when the information processor and the first battery are not connected; and if the battery voltage of the first battery is equal to or less than the predetermined voltage, both switching the source of power supply to the tamper-detection circuit from the first battery to the second battery and, when the first battery and the information processor are connected by way of the switch, halting the supply of power from the first battery to the information processor.

DESCRIPTION OF EMBODIMENTS

The configuration of the mobile terminal of the present exemplary embodiment is next described.

Figure 3:
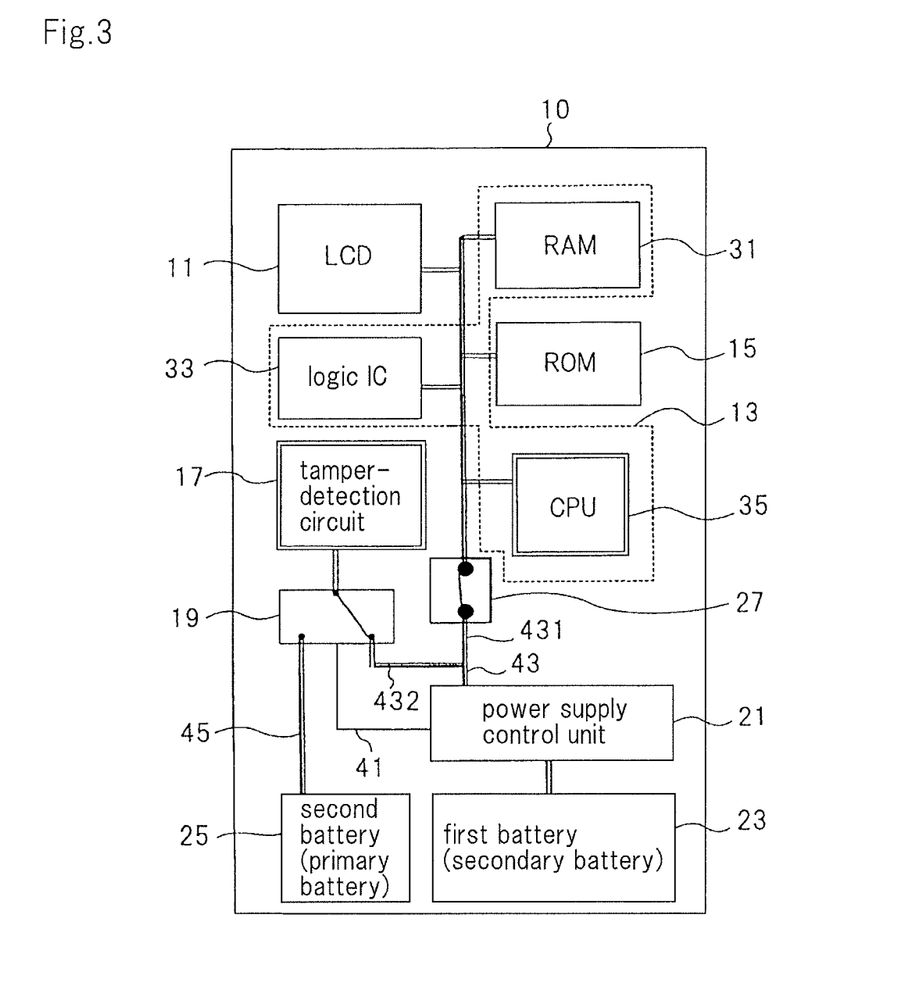
FIG. 3 is a block diagram showing an example of the configuration of the mobile terminal of the present exemplary embodiment.

FIG. 3 is a block diagram showing an example of the configuration of the mobile terminal of the present exemplary embodiment. Constructions that are the same as constructions shown in FIG. 1 are given the same reference numbers and detailed explanation of these constructions is omitted.

As shown in FIG. 3, mobile terminal 10 of the present exemplary embodiment includes: LCD 11, information processor 13, ROM 15, tamper-detection circuit 17, switch 19, power supply control unit 21 that supplies power to each unit, first battery 23, second battery 25, and DIP switch 27 provided between information processor 13 and power supply control unit 21.

In the present exemplary embodiment, first battery 23 is assumed to be a "secondary battery" that can be reused by charging. Second battery 25 is assumed to be a "primary battery" that can only be discharged and not be charged. Alternatively, both first battery 23 and second battery 25 may be primary batteries, both first battery 23 and second battery 25 may be secondary batteries, or first battery 23 may be a primary battery and second battery 25 may be a secondary battery.

In FIG. 3, the representation of signal lines for transmitting and receiving data or control signals between each of the components has been omitted with the exception of signal line 41 for transmitting by power supply control unit 21 a control signal to switch 19, and power supply lines from first battery 23 or second battery 25 are shown schematically.

As shown in FIG. 3, power-source supply line 43, after passing from first battery 23 by way of power supply control unit 21, splits into the two paths: a path to tamper-detection circuit 17 and a path to information processor 13. The path to information processor 13 is referred to as power-source supply line 431 and the path to tamper-detection circuit 17 via switch 19 is referred to as power-source supply line 432. Although described hereinbelow, in the normal state of use with power-supply switch in the ON state, power from first battery 23 is supplied by way of power-source supply line 431 to LCD 11 and ROM 15. Switches (not shown) that are ON/OFF controlled by information processor 13 are located between DIP switch 27 and LCD 11 and between DIP switch 27 and ROM 15, and when the switches are in the ON state, power is supplied to LCD 11 and ROM 15.

As shown in FIG. 3, DIP switch 27 is provided between power supply control unit 21 and information processor 13 of power-source supply line 431. When the operator turns DIP switch 27 ON, power-source supply line 431 is connected to first battery 23 by way of power supply control unit 21, and when the operator turns DIP switch 27 OFF, the connection between power-source supply line 431 and power supply control unit 21 is cut.

Power-supply control unit 21 may be a logic circuit dedicated to power supply control such as a gate array or may be of a construction that includes memory that stores a program and a CPU that executes a process in accordance with the program. Either construction is configured such that the source of power supply to tamper-detection circuit 17 is switched from first battery 23 to second battery 25 when first battery 23 is equal to or less than a predetermined voltage.

The switching of batteries is not limited to times when the battery voltage of first battery 23 is equal to or less than a predetermined voltage and is also carried out when first battery 23 is removed from mobile terminal 10. When first battery 23 is removed, power supply control unit 21 detects that the battery voltage of first battery 23 has become zero.

Figure 4:
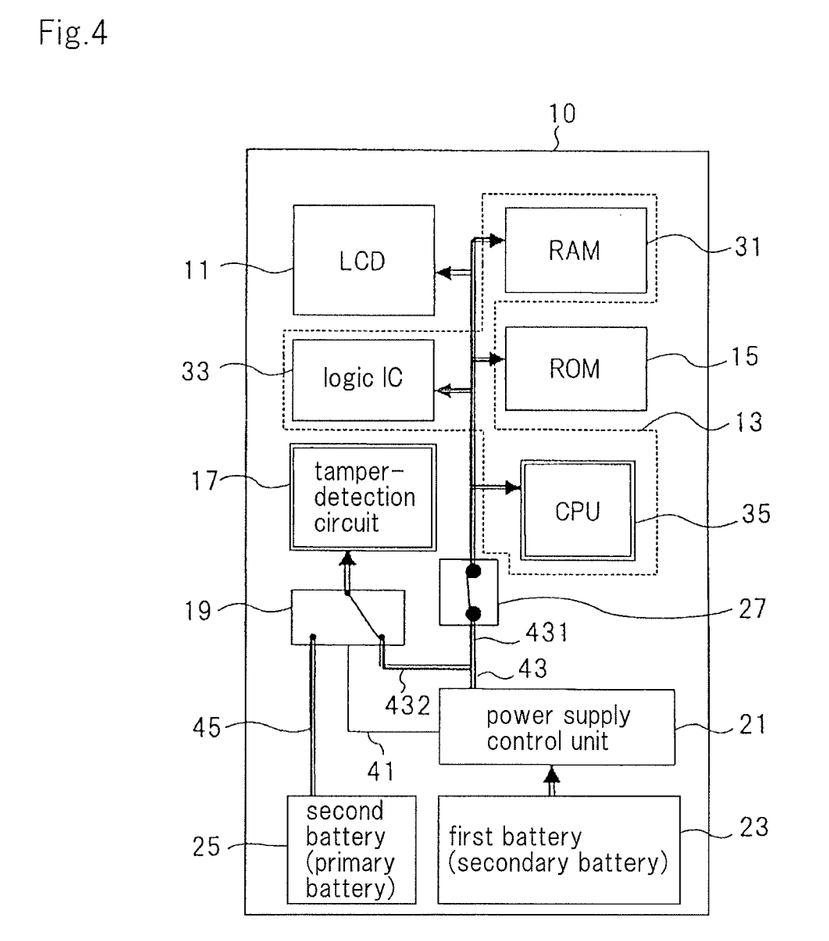
FIG. 4 shows the normal state of use when the power-supply switch is in the ON state in the mobile terminal shown in FIG. 3.

The method of supplying power in the normal state of use with the power-supply switch in the ON state in mobile terminal 10 of the present exemplary embodiment is next described. FIG. 4 shows the normal state of use with power-supply switch in the ON state in the mobile terminal shown in FIG. 3. DIP switch 27 is set to ON.

In the normal state of use with power-supply switch of mobile terminal 10 turned ON, power from first battery 23 is supplied from power supply control unit 21 to information processor 13 and ROM 15 by way of power-source supply line 43 and power-source supply line 431. Switches (not shown) that are ON/OFF controlled by information processor 13 are arranged between DIP switch 27 and LCD 11 and between DIP switch 27 and ROM 15, and when the switches are in the ON state, power is supplied to LCD 11 and ROM 15. By transmitting control signals to switch 19 by way of signal line 41, power supply control unit 21 controls switch 19 to connect tamper-detection circuit 17 to power-source supply line 432 or power-source supply line 45. Here, the battery voltage of first battery 23 is greater than the predetermined voltage, and switch 19 therefore, under the control of power supply control unit 21, connects tamper-detection circuit 17 to power-source supply line 432 that extends from first battery 23.

In this way, when power-supply switch is in the ON state, power from first battery 23 is supplied to LCD 11, ROM 15, RAM 31, logic IC 33, CPU 35, and tamper-detection circuit 17.

Figure 5:
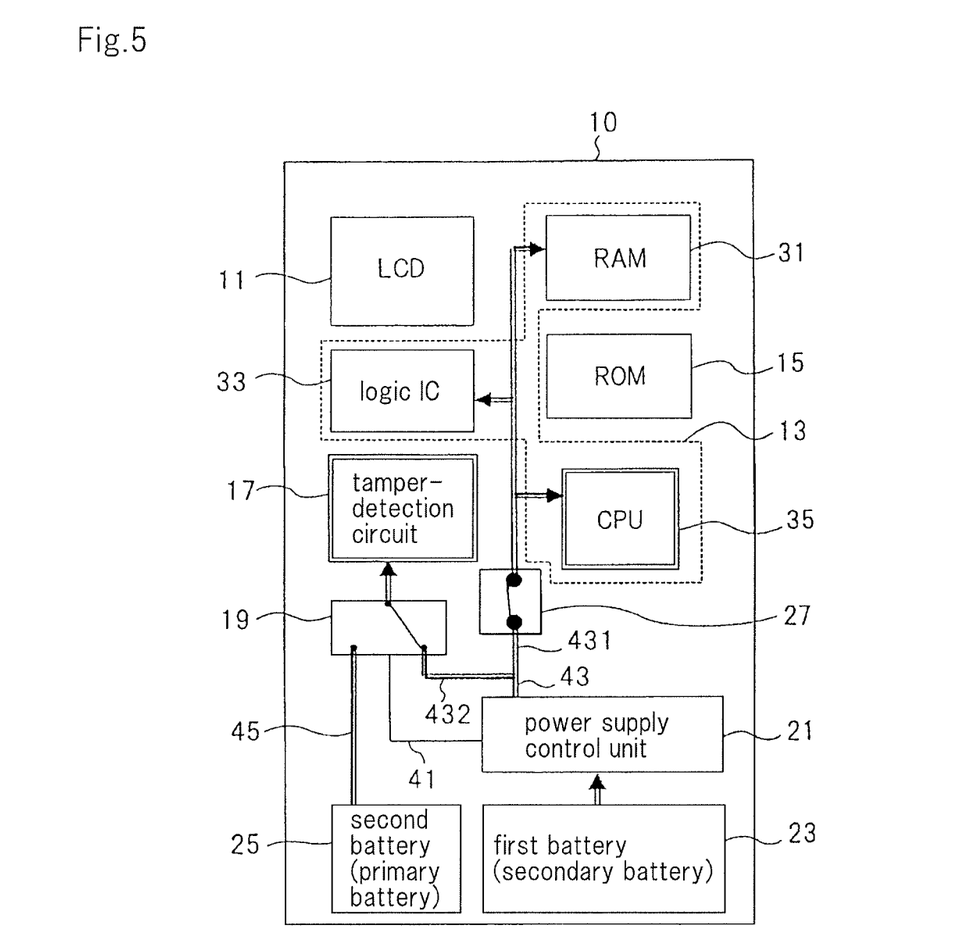
FIG. 5 shows the suspend state in the mobile terminal shown in FIG. 3.

The method of supplying power in the suspend state in mobile terminal 10 of the present exemplary embodiment is next described. FIG. 5 shows the suspend state in the mobile terminal shown in FIG. 3. DIP switch 27 is set to the ON state.

When the power-supply switch of mobile terminal 10 is turned OFF, resulting in the suspend state, information processor 13 turns OFF a switch (not shown), whereby the power supply to LCD 11 and ROM 15 is halted, but power supply from first battery 23 to RAM 31, logic IC 33, and CPU 35 is maintained to allow information processor 13 to execute the suspend function. In addition, power supply to tamper-detection circuit 17 from first battery 23 is also maintained.

Thus, in the suspend state, power supply from first battery 23 is continued to information processor 13 that includes RAM 31, logic IC 33, and CPU 35, whereby information processor 13 executes the suspend function, thus maintaining a state in which not only can operation be resumed at any time but power consumption can be suppressed compared to the normal state of use in which the power-supply switch is in the ON state. In addition, resistance to tampering can be maintained because the power supply to tamper-detection circuit 17 is maintained.

Figure 6:
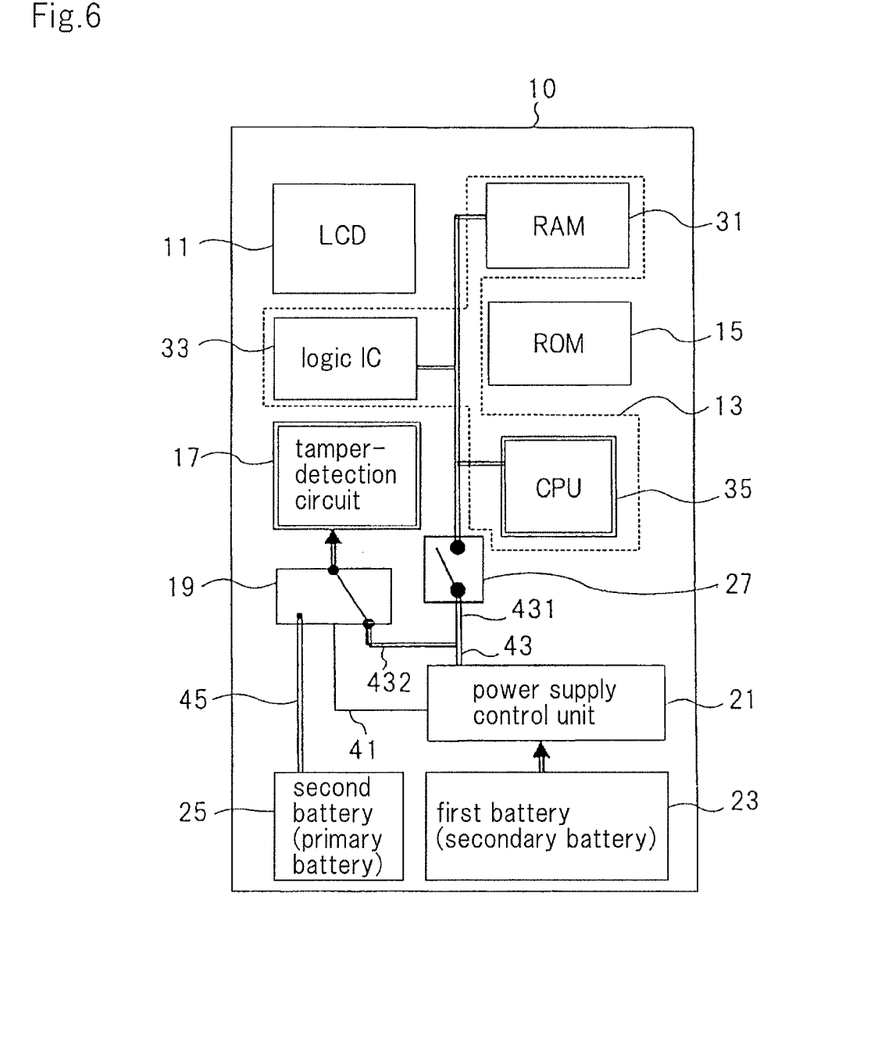
FIG. 6 shows the state when the mobile terminal shown in FIG. 3 is kept in reserve.

The method of supplying power when mobile terminal 10 of the present exemplary embodiment is held in reserve is next described. FIG. 6 shows the state when the mobile terminal shown in FIG. 3 is held in reserve.

When mobile terminal 10 is held in reserve, the operator turns OFF the power-supply switch of mobile terminal 10, and further, turns OFF DIP switch 27 as shown in FIG. 6 because the suspend function is unnecessary. DIP switch 27 is set to OFF, whereby power from first battery 23 is not supplied to information processor 13.

Thus, when mobile terminal 10 is held in reserve, turning OFF DIP switch 27 allows the suspend function to be made inactive. As a result, the battery capacity of first battery 23 is used only for tamper-detection circuit 17 that consumes little power, whereby power resulting from first battery 23 can be used by tamper-detection circuit 17 for a long time and the power of first battery 23 can be used efficiently.

Figure 7:
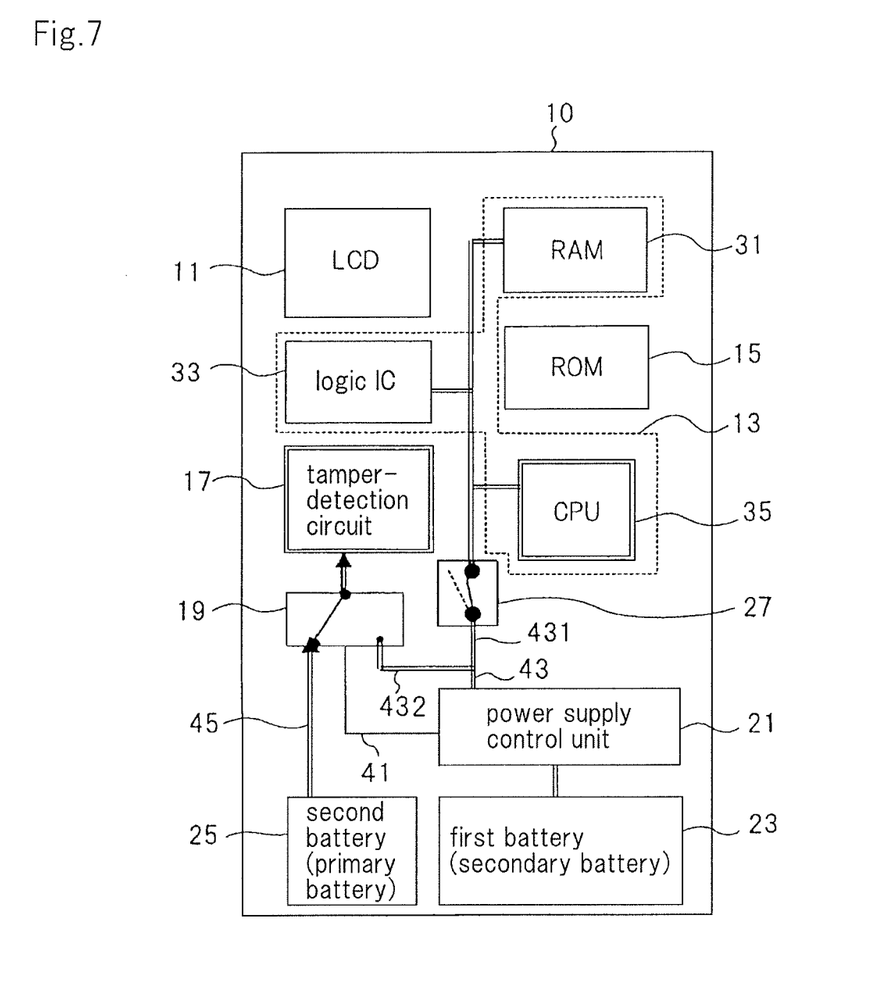
FIG. 7 shows a case in which the tamper-detection circuit is operated by the second battery in the mobile terminal shown in FIG. 3.

The operation of power supply control unit 21 when the battery voltage of first battery 23 falls to or below a predetermined voltage is next described. FIG. 7 shows a case in which the tamper-detection circuit is operated by the second battery in the mobile terminal shown in FIG. 3. In this case, DIP switch 27 may be set to either ON or OFF. In FIG. 7, the solid line shows the case in which DIP switch 27 is turned ON and the broken line shows the case in which DIP switch 27 is turned OFF.

When the battery voltage of first battery 23 is equal to or less than the predetermined voltage, power supply control unit 21 halts the power supply to information processor 13. In addition, power supply control unit 21 transmits a control signal to switch 19 by way of signal line 41 and thus controls switch 19 such that tamper-detection circuit 17 is connected to power-source supply line 45 that extends from second battery 25. This control is also carried out when first battery 23 is removed from mobile terminal 10.

In this way, when the battery voltage of first battery 23 is equal to or less than a predetermined voltage or when first battery 23 is removed, power is supplied to tamper-detection circuit 17 from second battery 25 for back-up and resistance to tampering is maintained.

Second battery 25 for back-up is used when first battery 23 is not installed in mobile terminal 10 or when the battery voltage of first battery 23 is equal to or less than a predetermined voltage, but in the present exemplary embodiment, if the suspend function is made inactive when mobile terminal 10 is being held in reserve, the power of first battery 23 can be used efficiently, and the time from when initiating the sate, in which the mobile terminal is held in reserve, until the time when use of the second battery for back-up is initiated, can be lengthened.

A concrete example is provided here to show the degree to which the interval, from the time of initiating the state, in which mobile terminal 10 is held in reserve, until the time when use of the second battery for back-up is initiated, can be lengthened in mobile terminal 10 of the present exemplary embodiment.

The battery capacity of first battery 23 is assumed to be 2000 mAh, the consumed current of information processor 13 that is necessary during execution of the suspend function is assumed to be 5 mA, and the consumed current of tamper-detection circuit 17 is assumed to be 50 μA.

Under these conditions, when mobile terminal 100 that was described in the background art is held in reserve for a long interval, a current of (5 mA+50 μA) is consumed in mobile terminal 100 even if the power-supply switch is turned OFF because the suspend function is active.

In the case of mobile terminal 100, even if first battery 23 that has been fully charged is installed, the time from the start of power supply by first battery 23 until switching to second battery 25 for back-up is, referring to Formula (1), calculated to be approximately sixteen days:

$$2000 \text{ [mAh]}/5.05 \text{ [mA]} \approx 396 \text{ [h]} (\approx 16.5 \text{ days})$$

In contrast, when mobile terminal 10 of the present exemplary embodiment is held in reserve for a long interval, the destination of the power supply from first battery 23 is only tamper-detection circuit 17 because the suspend function is inactive, whereby the consumed current of mobile terminal 10 is 50 μA.

In the case of mobile terminal 10, if first battery 23 that is fully charged is installed, the time interval from the start of power supply by first battery 23 until switching to second battery 25 for back-up is, referring to Formula (1), calculated to be approximately 1667 days:

$$2000 \text{ [mAh]}/0.05 \text{ [mA]} = 40000 \text{ [h]} (\approx 1667 \text{ days})$$

Comparing the calculation results, it can be seen that the time interval from the start of power supply by first battery 23 until switching to second battery 25 for back-up in mobile terminal 10 of the present exemplary embodiment is 100 times longer than in mobile terminal 100.

Figure 8:
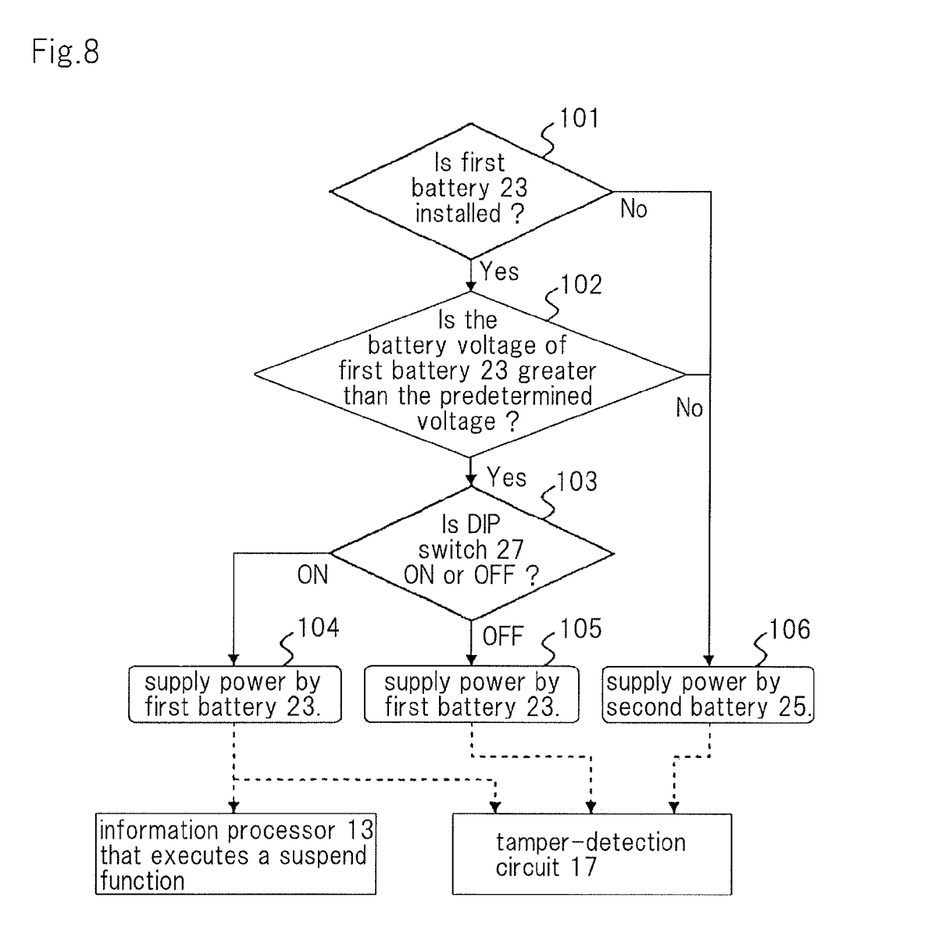
FIG. 8 is a view for describing the method of supplying power to the tamper-detection circuit and information processor.

The method of supplying power to tamper-detection circuit 17 and information processor 13 that executes the suspend function in a state in which the power-supply switch of mobile terminal 10 is turned OFF and in which the state transitions to the suspend state is next described. FIG. 8 is a view for describing the method of supplying power to the tamper-detection circuit and information processor when the power-supply switch has been turned OFF and the state transitions to the suspend state. The broken-line arrows show the destinations of power supply.

When first battery 23 is installed (Step 101), power supply control unit 21 judges whether the battery voltage of first battery 23 is equal to or less than a predetermined voltage (Step 102), and when the battery voltage of first battery 23 is greater than the predetermined voltage and DIP switch 27 is in the ON state (Step 103), power from first battery 23 is supplied from power supply control unit 21 to both tamper-detection circuit 17 and information processor 13 that executes the suspend function (Step 104). On the other hand, when DIP switch 27 is in the OFF state (Step 103), power resulting from first battery 23 is supplied to tamper-detection circuit 17 but is not supplied to information processor 13 (Step 105).

When first battery 23 is not installed (Step 101) or when the battery voltage of first battery 23 is equal to or less than the predetermined voltage in Step 102, power realized by second battery 25 is supplied to tamper-detection circuit 17 by the switching of switch 19 to the second battery 25 side (Step 106).

Figure 9:
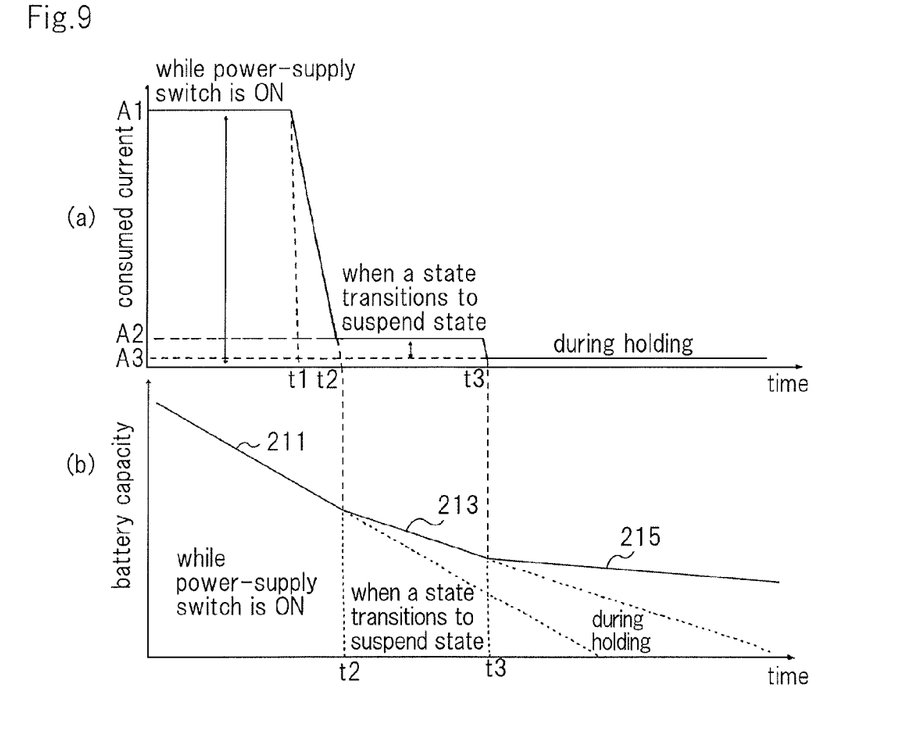
FIG. 9 is a graph showing change of the consumed current and change of the battery capacity of the first battery of the mobile terminal in the present exemplary embodiment.

Change of the consumed current and change in the battery capacity of first battery 23 in mobile terminal 10 are next described for each of the states during normal use, during the suspend state, and during the state in which mobile terminal 10 is held in reserve.

FIG. 9(a) is a graph showing the change in the consumed current of the mobile terminal of the present exemplary embodiment, and FIG. 9(b) is a graph showing the change of battery capacity of the first battery. The vertical axis of the graph of FIG. 9(a) shows the consumed current and the horizontal axis shows time. The vertical axis of the graph of FIG. 9(b) shows the battery capacity and the horizontal axis shows time.

In FIG. 9, t1 is the time that the operator turns OFF the power-supply switch of mobile terminal 10, t2 is the time at which information processor 13 transitions to the suspend state, and t3 is the time that DIP switch 27 is set to OFF.

As shown in FIG. 9(a), power is supplied to information processor 13, LCD 11, ROM 15, and tamper-detection circuit 17 and the consumed current is the value A1 during the interval in which the power-supply switch is in the ON state and the operator is using mobile terminal 10. When the operator turns OFF the power-supply switch at time t1, CPU 35 saves the information showing the state immediately before the power-supply switch was turned OFF in RAM 31, and the state transitions to the suspend state at time t2. Power is thus supplied to tamper-detection circuit 17 and information processor 13 during the interval between time t2 and t3, and as shown in FIG. 9(a), the consumed current decreases greatly from A1 to become the value A2. Looking at the slope that indicates the change of the battery capacity of FIG. 9(b), the inclination of straight line 213 that indicates a change of battery capacity in the state in which the suspend function is being executed is less than that of straight line 211 that indicates a change of battery capacity in the state in which the power-supply switch is in the ON state.

Next, when the operator turns OFF DIP switch 27 at time t3 to place the mobile terminal in reserve, power is supplied only to tamper-detection circuit 17 after time t3, and as shown in FIG. 9(a), the consumed current becomes the value A3 that is even lower than A2. As shown in FIG. 9(b), the inclination of straight line 215 that indicates change of the battery capacity during the period in which the mobile terminal is held in reserve is even less than that of straight line 213.

In a case in which the mobile terminal is held in reserve and the suspend function is made active, the change in battery capacity of first battery 23 is indicated by the broken line in FIG. 9(b). Comparing the broken line of straight line 213 and straight line 215, the broken line of straight line 213, i.e., the battery capacity, becomes zero at an earlier time than straight line 215, and it can therefore be seen from FIG. 9(b) that turning OFF DIP switch 27 lengthens the life of the battery capacity of first battery 23.

In the mobile terminal of the present exemplary embodiment, placing the DIP switch that is provided in the power-source supply line that connects the first battery and the information processor in an ON state activates the suspend function even if the power-supply switch is turned OFF, and after turning OFF the power-supply switch, operations can start from the state that immediately preceded turning OFF the power-supply switch the next time the power-supply switch is turned ON. In addition, when the mobile terminal is held in reserve for a long period, the suspend function becomes unnecessary and the suspend function is therefore made inactive by placing the DIP switch in the OFF state. In this case, the destination of the power supply of the first battery becomes only the tamper-detection circuit that has low power consumption, whereby the power supply of the first battery can be used for the tamper-detection circuit for a long time period. As a result, the interval during which the mobile terminal is placed in reserve until the second battery is used for back-up can be lengthened while maintaining resistance to tampering, and the life of the battery can be extended when the first battery and second battery are considered as a single battery.

By switching between the state in which the mobile terminal is normally used and the state in which the mobile terminal is held in reserve by turning ON and OFF the DIP switch, the suspend function becomes active even when the power-supply switch is turned OFF during normal use, enabling the method of use that was used to this point.

Although a case has been described in the above-described exemplary embodiment in which the power-supply switch is turned OFF to transition to the suspend state, the same effect is obtained for a case in which transition is made to a power-saving suspend state without turning OFF the power-supply switch when there has been no input such as key-in for a fixed interval with the power-supply switch in the ON state.

Figure 10:
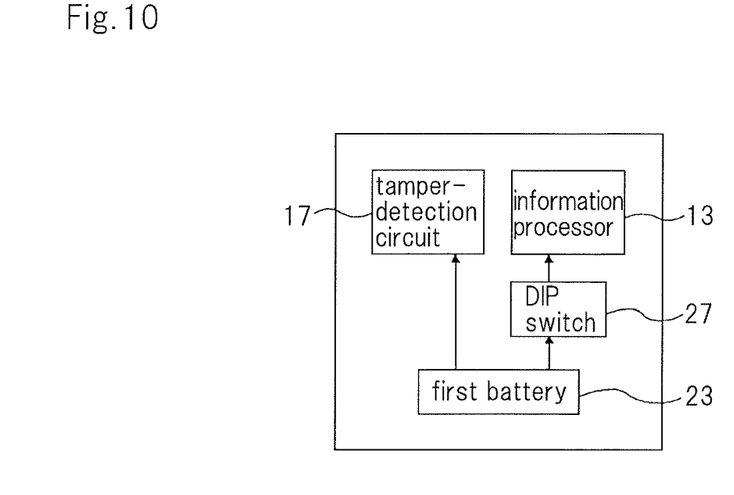
FIG. 10 is a block diagram showing another example of the configuration of the mobile terminal of the present exemplary embodiment.

Although details of the configuration of a mobile terminal have been described in the above-described exemplary embodiment to facilitate explanation of the present invention, a mobile terminal for executing the control that is characteristic of the present invention should include at least tamper-detection circuit 17, information processor 13, first battery 23, and DIP switch 27, as shown in FIG. 10. The arrows shown in FIG. 10 are power-source supply lines.

The DIP switch may be of the sliding or locking type. In addition, although the use of a DIP switch has been described in the present exemplary embodiment, another switch may be employed as long as it is a mechanical switch that allows the operator to manually switch between ON and OFF.

The advantage obtained by enabling the operator to change the setting whether or not the suspend function is activated by a mechanical switch when the power-supply switch is in the OFF state is next described.

A case is first described in which the setting of the suspend function is implemented by software. When setting of the suspend function is implemented by an application software program that is executed by CPU 35, the operator must turn ON the power-supply switch of the mobile terminal, manipulate the mobile terminal to display on LCD 11 the setting screen of the suspend function, and provide input as to whether the suspend function is to be active. In addition, even when the operator checks whether or not the suspend function has been set, the operator must take the time and trouble, because the operator manipulates the mobile terminal to display the above-described setting screen on LCD 11 in the sate in which the power-supply switch of the mobile terminal in the ON state and then the operator checks whether or not the suspend function has been set by watching LCD 11.

In contrast, in a configuration that allows the operator to set whether or not the suspend function is activated by a mechanical switch, as in the present exemplary embodiment, the operator is able to check the current state of the suspend function by just looking at the mechanical switch. Not only is it possible to check the set state of whether the suspend function is active or not, the set state can also be changed when the suspend function is active, even when the power-supply switch of the mobile terminal is in the OFF state. As a result, regardless of the state in which the operator has to change the settings when the suspend function is active or the state in which the operator has to check the set state of the suspend function, the operator is relieved of the inconvenience of having to turn ON the power-supply switch of the mobile terminal or of carrying out operations to display the setting screen on LCD 11.

The present invention can be applied generally to compact mobile terminals that require a tamper detection function.

As one example of the effect of the present invention, when holding a mobile terminal in reserve for a long interval, the consumed power can be reduced while maintaining resistance to tampering.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-077800 filed on Mar. 30, 2010, the content of which is incorporated by reference.

EXPLANATION OF REFERENCE NUMBERS 10 mobile terminal
11 LCD
13 information processor
15 ROM
17 tamper-detection circuit
19 switch
21 power supply control unit
23 first battery
25 second battery
27 DIP switch

What is claimed is:

1. A mobile terminal including a tamper-detection circuit, an information processor that is capable of executing a suspend function, a first battery supplying power to said information processor and said tamper-detection circuit, wherein the improvement comprises a switch provided in the power-source supply line that connects said first battery and said information processor and said switch being capable of switching between a state in which said information processor is connected to said first battery and a state in which said information processor is not connected to said first battery, wherein said tamper-detection circuit, when power is supplied to the tamper-detection circuit, maintains resistance to tampering regardless of whether or not power is supplied to said information processor, said switch is not provided in a power-source supply line that connects said first battery and said tamper-detection circuit, and said switch is a mechanical switch that allows an operator to manually switch between ON and OFF, and that allows the operator to confirm a state whether or not said suspend function is activated.

2. The mobile terminal according to claim 1, further comprising:

a second battery that is a back-up battery; and a power-supply control unit that, when the battery voltage of said first battery is equal to or less than a predetermined voltage, both switches the source of power supply to said tamper-detection circuit from said first battery to said second battery and, when said first battery and said information processor are connected by way of said switch, halts the supply of power from said first battery to said information processor.

* * * * *